(12) United States Patent
Rees et al.

(10) Patent No.: US 6,225,819 B1
(45) Date of Patent: *May 1, 2001

(54) TRANSMISSION LINE IMPEDANCE MATCHING OUTPUT BUFFER

(75) Inventors: David B. Rees, Overton; Jonathan Withrington, Pulborough, both of (GB)

(73) Assignee: Cypress Semiconductor Corp., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/040,033

(22) Filed: Mar. 17, 1998

(51) Int. Cl.[7] ............................................. G03K 19/0185
(52) U.S. Cl. .................................. 326/30; 326/83; 326/87
(58) Field of Search ................................ 326/86, 87, 30, 326/83

(56) References Cited

U.S. PATENT DOCUMENTS

| 4,042,838 | 8/1977 | Street et al. | 307/270 |
|---|---|---|---|
| 4,219,743 | 8/1980 | Millns et al. | 307/270 |
| 4,484,092 | 11/1984 | Campbell, Jr. | 307/578 |
| 4,503,343 | 3/1985 | Ohuchi | 307/482 |
| 4,540,898 | 9/1985 | Pumo et al. | 307/269 |
| 4,574,273 | 3/1986 | Atsumi et al. | 307/475 |
| 4,612,462 | 9/1986 | Asano et al. | 307/482 |
| 4,725,746 | 2/1988 | Segawa et al. | 307/482 |
| 5,038,056 | 8/1991 | Koide et al. | 307/448 |
| 5,057,715 | 10/1991 | Larsen et al. | 307/451 |

(List continued on next page.)

FOREIGN PATENT DOCUMENTS

| 0045133 | 2/1982 | (EP) | H03K/5/02 |
|---|---|---|---|
| 0046498 | 3/1982 | (EP) | H03K/5/02 |
| 00129661 | 1/1985 | (EP) | H03K/5/02 |
| 52-35570A | 3/1977 | (JP) | H03K/17/12 |
| 53-125753 | 2/1978 | (JP) | H03K/19/08 |
| 59-16242A | 1/1984 | (JP) | H03K/19/094 |

OTHER PUBLICATIONS

"MOSFET Powering Circuit", Sonoda, G., IBM Technical Disclosure Bulletin, vol. 13, No. 9, pp. 2658, Feb. 1971.

"Bootstrap Inverter Driver", Harroun, V.T., IBM Technical Disclosure Bulletin, vol. 19, No. 3, pp. 827–828, Aug. 1976.

"Bufferized ECL–Type Logic Circuit", IBM Technical Disclosure Bulletin, vol. 33, No. 4, pp. 343–344, Sep. 1990.

(List continued on next page.)

Primary Examiner—Brian Young
Assistant Examiner—Don Phu Le
(74) Attorney, Agent, or Firm—Christopher P. Maiorana, P.C.

(57) ABSTRACT

An output buffer includes a continuously variable output impedance proportional to the load transmission line impedance. The buffer includes an output stage, such as a pullup/pulldown transistor, for receiving an input signal and generating an output signal on an output node in response thereto. In addition, the buffer includes a control circuit and a low-impedance driver in an electrical communication with the output node and, preferably, disposed in parallel with at least one of the pullup and/or pulldown transistors. The control circuit receives the output node voltage and generates a control signal on a control node that varies according to the magnitude of the output node voltage. The driver is biased by the control signal and has a conductivity that varies according to the control signal. The variations in the conductivity are operative to adjust the output impedance of the buffer. The control circuit may include a voltage follower circuit that maintains an offset between the output node voltage and the control node voltage.

19 Claims, 5 Drawing Sheets

U.S. PATENT DOCUMENTS

| | | | |
|---|---|---|---|
| 5,073,726 | 12/1991 | Kato et al. | 307/443 |
| 5,150,186 | 9/1992 | Pinney et al. | 357/42 |
| 5,179,299 | 1/1993 | Tipon | 307/443 |
| 5,216,290 | 6/1993 | Childers | 307/296.1 |
| 5,241,502 | 8/1993 | Lee et al. | 365/203 |
| 5,270,588 | 12/1993 | Choi | 307/475 |
| 5,281,869 | 1/1994 | Lundberg | 307/443 |
| 5,319,259 | 6/1994 | Merrill | 307/443 |
| 5,365,118 | 11/1994 | Wilcox | 327/109 |
| 5,373,199 | 12/1994 | Schichinohe et al. | 327/328 |
| 5,381,061 | 1/1995 | Davis | 326/57 |
| 5,399,920 | 3/1995 | VanTran | 326/83 |
| 5,444,397 | 8/1995 | Wong et al. | 326/81 |
| 5,514,994 | 5/1996 | Sawada | 327/390 |
| 5,528,166 * | 6/1996 | Ilkbahar | 326/30 |
| 5,559,447 * | 9/1996 | Rees | 326/83 |
| 5,565,794 | 10/1996 | Porter | 326/81 |
| 5,587,678 | 12/1996 | Dijkmans | 327/108 |
| 5,656,571 | 8/1997 | Miller et al. | 504/116 |
| 5,717,343 * | 2/1998 | Kwong | 326/83 |
| 5,781,034 | 7/1998 | Rees et al. | 326/86 |
| 5,828,262 | 10/1998 | Rees | 327/390 |
| 5,874,838 | 2/1999 | Rees | 326/86 |
| 5,877,647 * | 3/1999 | Vajapey et al. | 327/391 |
| 5,894,241 | 4/1999 | Rees | 327/390 |
| 5,898,321 * | 4/1999 | Ilkbahar et al. | 326/83 |

OTHER PUBLICATIONS

"Bootstrapped FET Driver", Lewis et al., IBM Technical Disclosure Bulletin, vol. 18, No. 11, Apr. 1976.

"Field Effect Transistor Driver Circuit", Kalter et al., IBM Technical Disclosure Bulletin, vol. 18, No. 4, Sep. 1975.

"CMOS VLSI Design: A Systems Perspective", Weste et al., Addison–Wesley, 1998, pp. 55–57.

* cited by examiner

TRANSMISSION LINE IMPEDANCE MATCHING OUTPUT BUFFER

BACKGROUND OF THE INVENTION

1. Field of the Invention

The present invention relates to integrated circuits, and, more particularly, to improving the output of such circuits during state transitions.

2. Discussion of the Related Art

An output buffer of an integrated circuit is generally provided for transferring signals from an internal logic circuit, to an output of the integrated circuit. The term "buffer" may also refer to an entire integrated circuit dedicated solely to driving signal lines, which would include one or more output buffers. The output of the integrated circuit may be connected to a near-end of various wires, cables or printed circuit board traces of a single circuit board, or between multiple printed circuit boards through a backplane. The foregoing structures connected to the output buffer may be generally described as an electrical transmission line, especially when the output buffer is driving electrical signals with fast edge rates. In addition, the far-end of the transmission line may be connected to an input terminal of another integrated circuit. In the context of the communication of digital signals, the varying electrical characteristics of the transmission line, as well as the far-end circuit input, gives rise to a number of problems.

One problem pertains to transmission line effects. If the far-end is improperly terminated and/or open circuit, an impedance mismatch and consequent signal reflections may occur. In the open circuit context, transitions of the output signal generated by the output buffer may result in undershoots and overshoots relative to the desired steady state value. These signal variations may exceed the maximum rated input voltage of any receiving unit to which the transmission line is connected. In addition, the overshoots and undershoots may cross the threshold voltage of the receiver several times. This threshold crossing may result in the generation of system errors (e.g., logic errors).

To better appreciate other problems, further background is provided. The transmission line has a characteristic impedance $Z_o$. In addition, a real world output buffer exhibits an output impedance, which will be designated generally in this patent application as $R_s$. In practical implementations, the output buffer exhibits a different impedance profile depending on whether its output is transitioning high-to-low or low-to-high. Specifically, the buffer has a first output impedance profile when the output signal undergoes a low-to-high transition, contributed largely by the characteristics of the pullup transistor. In addition, the buffer has a second output impedance profile when the output signal undergoes a high-to-low transition, contributed largely by the pulldown transistor.

The degree to which the output buffer impedance matches the transmission line impedance bears on at least two characteristics of the buffer output signal: (i) a so-called "plateau" voltage level, and (ii) the amount of undershoot and overshoot (i.e., ringing). The plateau level refers to an intermediate step exhibited in the output signal of the buffer while transitioning, for example, from a high logic state to a low logic state (or vice versa). That is, for example, a high-to-low transition does not necessarily occur sharply but rather commences at a high level voltage, falls to and maintains at an intermediate voltage for a time, and then falls to a low (end state-steady state) voltage level. This intermediate step or plateau is caused by the fact that the output impedance of the buffer $R_s$ is effectively in series with the characteristic impedance of the transmission line $Z_o$, which forms a voltage divider. The height of the step or plateau depends on the relative values of $R_s$ and $Z_o$, and the length or duration of the step depends upon the round trip electrical delay of the output signal along the transmission line.

One problem arising in view of the foregoing is that the voltage level of the plateau may fail to define either a logic high or a logic low (i.e., may be an undefined voltage level). An output signal at this voltage level may generate spurious results at the input of any circuit to which it is connected, typically at the near end of the transmission line, causing system errors as well as causing excessive power dissipation. In addition, the problems associated with ringing in the output signal are well known (i.e., overvoltage, threshold crossing, etc., as described above).

One approach to these problems is described in U.S. Pat. No. 5,559,447 entitled "Output Buffer with Variable Output Impedance" issued Sep. 24, 1996, and commonly owned by the assignee of the present invention. In U.S. Pat. No. 5,559,447, an output buffer is disclosed that is controlled between two fixed output impedance values based on a threshold output signal voltage level. However, as switching speeds continue to increase, there continues to be a need for improved output impedance control.

Accordingly, there is a need to provide an improved output buffer that minimizes or eliminates one or more of the problems set forth above.

SUMMARY OF THE INVENTION

The present invention overcomes the disadvantages of conventional output buffers by providing an output buffer with a variable output impedance to match the transmission line. The buffer configures its output impedance in stages. First, the output buffer is configured to exhibit a relatively low output impedance during a first stage or portion of an output transition. This ensures the required plateau voltage is reached when driving a low impedance T Line. During a second stage or portion of the output transition that occurs after the first portion, the output buffer matches its output impedance to a set fraction of that of the transmission line. In this regard, the buffer is configured to have a reduced plateau level, approximately 1.2 volts or lower in one embodiment, to reduce the time during which the output voltage level is undefined (i.e., the transition time through the undefined voltage levels). During a third stage or portion of the output transition that occurs after the second portion, the output buffer is configured to increase its output impedance, thereby increasing the damping of noise oscillations which may otherwise result from the return wave from the far-end of the transmission line.

An output buffer according to the invention may include an output stage receiving an input signal and generating an output signal on an output node in response thereto. In addition, the output buffer may include means for adjusting an output impedance of the buffer as a function of a transmission line impedance over a predetermined range of output node voltages.

In a preferred embodiment, the adjusting means may include a control circuit and a driver. The control circuit is configured to receive the output node voltage and generate a control signal on a control node. The control signal varies in magnitude according to the magnitude of the output node voltage. The driver, preferably, is in electrical communication with the output node and has a conductivity that varies according to the control signal. Variations of the driver conductivity are operative to adjust the output impedance of the buffer. In a preferred embodiment, this is accomplished by disposing the driver in parallel electrical relation with the output stage, and, more particularly, in parallel with a pullup or pulldown transistor thereof. The control circuit, in a preferred embodiment, may include a voltage follower circuit or an equivalent thereof configured to maintain a nominal voltage offset between the control signal and the output signal.

Other objects, features, and advantages of the present invention will become apparent to one skilled in the art from the following detailed description and accompanying drawings illustrating features of this invention by way of example, but not by way of limitation.

DETAILED DESCRIPTION OF THE PREFERRED EMBODIMENTS

Figure 1:
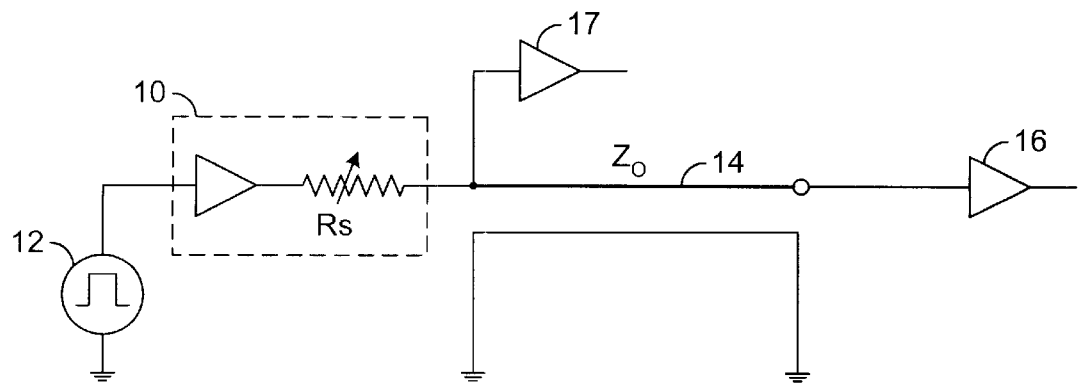
FIG. 1 is a simplified diagrammatic view of an output buffer in accordance with the present invention.

Referring now to the drawings wherein like reference numerals are used to identify identical components in the various views, FIG. 1 shows an output buffer 10 according to the present invention. Buffer 10 is shown receiving a signal from a signal source 12, and includes an output connected to the near-end of a transmission line 14, whose far-end is connected to a logic gate 16 and whose near end is connected to a logic gate 17. Output buffer 10 may be employed in all types of integrated circuits including integrated logic circuits, such as the assignee's FCT family, dedicated buffers, and other output circuitry, such as USB output buffers. The output impedance of the buffer, designated $R_s$, is shown as a variable impedance, in accordance with the present invention.

Signal source 12 is shown in diagrammatic fashion and may comprise an internal core or logic circuit in another portion of an integrated circuit in which output buffer 10 is embodied. Alternatively, source 12 may comprise external sources, such as signal generators resident on other integrated circuits. Transmission line 14 has a characteristic impedance $Z_o$.

Gate 16 is shown in diagrammatic form to generally illustrate that further electrical loads may be attached to the far-end of transmission line 14. The load presented by gate 16 may be largely capacitive when the input of gate 16 is composed largely of field effect transistors (i.e., the gate capacitance). The foregoing is exemplary only and is not intended to limit application of the present invention. Similarly, gates may be actually connected at any point along the transmission line.

Gate 17 is shown in diagrammatic form to generally illustrate that further electrical loads may be attached to the near-end of transmission line 14. The load presented by gate 17 may be largely capacitive when the input of gate 17 is composed largely of field effect transistors (i.e., the gate capacitance). The foregoing is exemplary only and is not intended to limit application of the present invention. Similarly, gates may be actually connected at any point along the transmission line.

Before proceeding to a detailed description of the preferred embodiments referenced to the drawings, a description of the output impedance control established by the present invention will be set forth.

Figure 2:
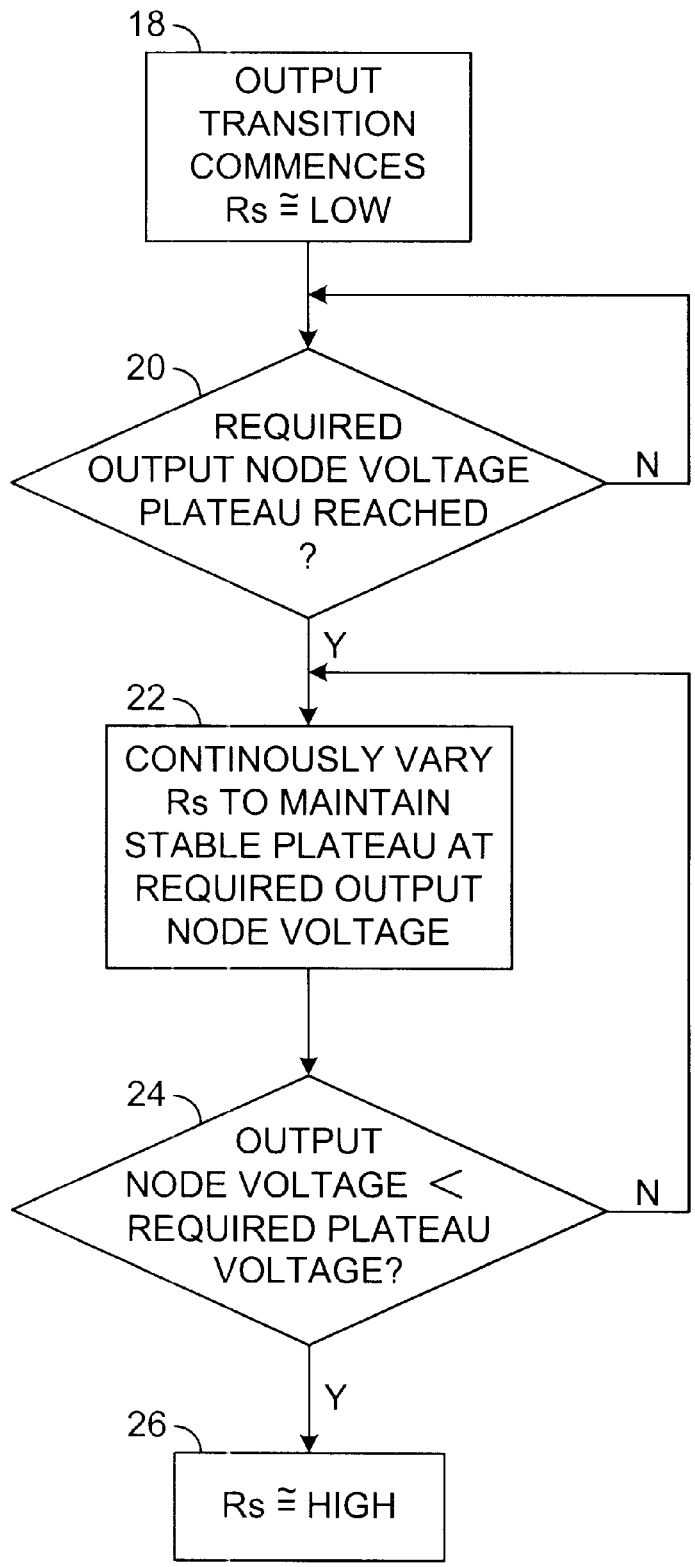
FIG. 2 is a simplified, flowchart diagram illustrating the basic operation of an output buffer according to the invention.

FIG. 2 shows a simplified flowchart diagram of the sequence through which output buffer 10 may operate. In step 18, output buffer 10 may be configured to have a relatively low output impedance $R_s$ when a transition in the output signal commences. This step applies whether the transition is a low-to-high transition or a high-to-low transition. For purposes of example only, in an output buffer having a device operating voltage $V_{cc}$ of approximately 3.3 volts, $V_{ss}$ at ground, and a transmission line having a characteristic impedance $Z_o$ ranging between 30 and 100 ohms, $R_s$ may preferably be below 30 ohms and may be approximately 17 ohms in one embodiment. The relatively low output impedance helps the buffer sink or source sufficient DC current from/to the transmission line to effect rapid change in the output signal voltage. The low output impedance is also to ensure that the plateau is actually reached. If, as in the above case $Z_o$ is about equal to 30 ohms, $R_s$ must be approximately 17 ohms or less to reach the required plateau voltage. While the preferred embodiments to be described in detail herein employ a substantially fixed impedance during this initial stage, it is not required to be fixed for purposes of the present invention. The foregoing occurs during a first stage or portion of the output transition.

In step 20, the output node voltage is tested to see whether it has reached a predetermined plateau level. If NO, the output buffer remains configured for the relatively low output impedance, as described above in connection with step 18. If YES, step 22 is performed. The predetermined, preferred plateau voltage is selected to be a definite logic state (as opposed to being undefined). For example, in an embodiment where $V_{cc}$ is approximately 3.3 volts, $V_{ss}$ is approximately 0 volts, and $Z_o$ is approximately between 30 ohms and 100 ohms, the plateau voltage level may be between about 0.8 and 2.2 volts, more preferably between about 1.0 and 1.2 volts, and most preferably not more than 1.2 volts. These values for the selected plateau voltage level are for a high-to-low transition. A low-to-high plateau level may differ. The plateau voltage is a function of both the output impedance of buffer 10, namely $R_s$, and the characteristic impedance of the transmission line $Z_o$. The voltage of the plateau is further selected so as to avoid generation of spurious or erroneous logic states at the near-end, such as at the output of gate 17 in FIG. 1. In addition, another advantage of selecting a relatively low (for a high-to-low transition)and stable plateau voltage is that the near-end gate can rely on the integrity of its input signal (i.e., buffer output signal) more quickly after the output transition commences. If the plateau level were set too high in this example, the near-end gate would not be able to rely on the data at its input until after the plateau interval had passed, when the buffer output signal had fallen off sufficiently towards $V_{ss}$ to avoid an indefinite state. Proper selection of the plateau level therefore improves system switching speed (i.e., reduces delay).

Step 22 is performed when the output node voltage reaches the preferred plateau voltage. In step 22, the output impedance $R_s$ of buffer 10 is varied to maintain a relatively stable plateau output node voltage. In effect, during this interval, the output impedance is varied as a function of the impedance of the load transmission line. This reduces the undefined state time of the output signal of buffer 10. The foregoing occurs during a second stage or portion of the output transition.

In step 24, the output node voltage is tested against a threshold voltage which is required to be much lower than the preferred plateau voltage. For a high-to-low transition, and where $V_{cc}$ is approximately 3.3 volts and $V_{ss}$ is approximately 0 volts, and where $Z_o$ is approximately between about 30 and 100 ohms, the threshold may be about one device threshold $V_{th}$ above $V_{ss}$ (for example). This marks the end of the second stage.

Step 26 marks the beginning of a third stage or portion of the output transition. In step 26, the output impedance $R_s$ increases to a relatively high level. For example, in an embodiment where $V_{cc}$ is approximately 3.3 volts, $V_{ss}$ is approximately 0 volts, and where $Z_o$ is approximately between about 30 and 100 ohms, the output impedance $R_s$ may be increased to about 57 ohms. This value may be further increased to optimize damping of reflected signals. While the preferred embodiments described herein employ a substantially fixed impedance during this stage, it is not required that the output impedance be fixed for purposes of the present invention.

Figure 3:
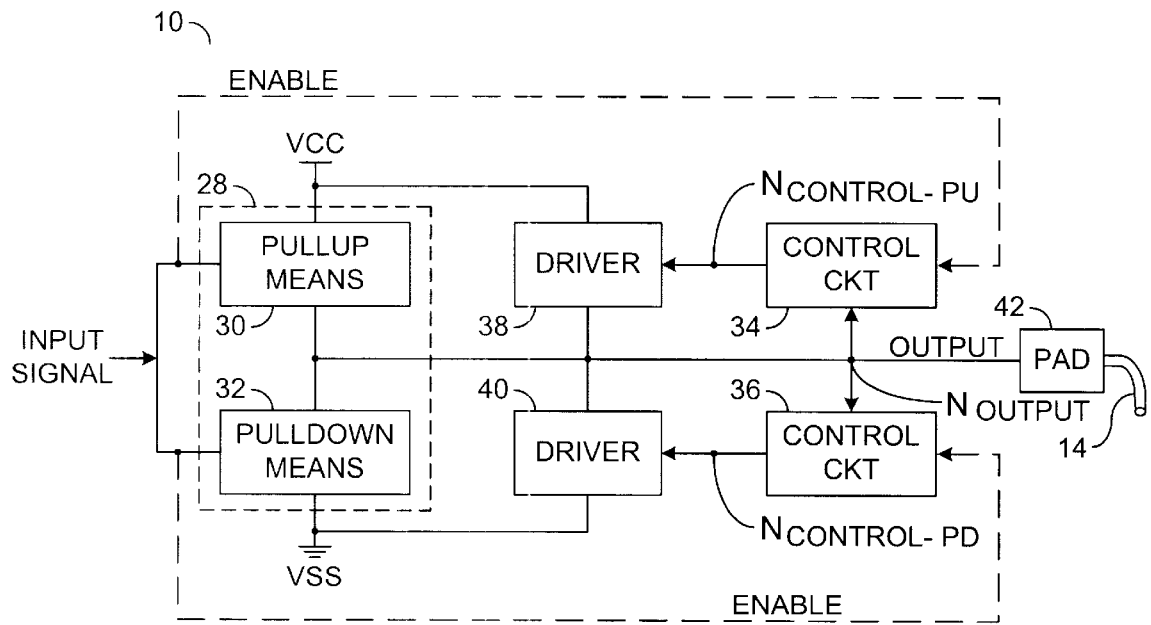
FIG. 3 is a simplified block diagram view of an integrated circuit including an output buffer according to the present invention.

FIG. 3 shows a simplified schematic and block diagram of an output buffer 10 according to the present invention. Buffer 10 includes an output stage 28 receiving an input signal and generating an output signal on an output node $N_{output}$ in response thereto. Output stage 28 may include pullup means 30, and pulldown means 32. Buffer 10 may further include a pullup control circuit 34, a pulldown control circuit 36, a pullup low-impedance driver 38, and a pulldown low-impedance driver 40. Buffer 10 may be connected to pad 42.

Pullup means 30 is configured for selectively coupling the output node $N_{output}$ to a high level voltage, such as $V_{cc}$, for generating the output signal in a high logic state. Pullup means 30 may comprise one or more pullup transistors, which may be field effect transistors. The aggregate output impedance contributed by pullup means 30 when active may be relatively large compared to that contributed by driver 38.

Pulldown means 32 is configured for selectively coupling the output node $N_{output}$ to a low level voltage, such as $V_{ss}$, for generating the output signal in a low logic state. Pulldown means 32 may comprise one or more pulldown transistors, which may be field effect transistors. The aggregate output impedance contributed by pulldown means 32 when active may be relatively large compared to the output impedance contributed by driver 40.

Pullup control circuit 34 and driver 38 form a first means for adjusting an output impedance of buffer 10 as a function of a transmission line impedance over a first predetermined range of output node voltages when output buffer 10 transitions low-to-high. Likewise, pulldown control circuit 36 and driver 40 form a second means for adjusting the output impedance of buffer 10 as a function of the transmission line impedance over a first predetermined range of output node voltages when output buffer 10 transitions high-to-low. Either one or both of the first means 34/38 or second means 36/40 may be used in an output buffer, depending on factors including the fabrication technology being used, and the particular application. First adjusting means 34/38 is configured to be used in connection with an active pullup means 30, while second adjusting means 36/40 is configured to be used in connection with an active pulldown means 32.

Control circuit 34, when active, as well as control circuit 36, when active, are both configured to receive the output node voltage appearing on the output node $N_{output}$. Each generates in response thereto a respective control signal on control nodes $N_{CONTROL-PU}$ and $N_{CONTROL-PD}$. The control signals vary in accordance with the magnitude of the output node voltage. Control circuit 34, as well as control circuit 36, may each optionally receive an enable signal derived from the buffer input signal to ensure that the control signals are not generated when either pullup or pulldown means are inactive to maintain drivers 38 and 40 in a non-conductive state, respectively. It should be understood that the pullup circuitry and the pulldown circuitry are normally not active at the same time.

Drivers 38 and 40 are each disposed in electrical communication with the output node and each have a respective conductivity associated therewith that varies in accordance with the control signals applied thereto. Variations in the conductivity of drivers 38 and 40 are operative to adjust the output impedance of the output buffer 10 for low-to-high transitions and high-to-low transitions, respectively.

Each of the preferred embodiments described below (illustrated in FIGS. 4, 7, 8, 9, 10) are shown in partial schematic form. Specifically, only the pulldown circuitry is shown in greater detail in these figures for a description of the invention in the context of a high-to-low state transition. It should be understood that this is exemplary only and not limiting in nature. Specifically, it is contemplated that embodiments having pullup circuitry (as shown in FIG. 3) may fall within the spirit and scope of the invention, as well as embodiments having both pullup and pulldown circuitry. The invention is only limited by the appended claims.

Figure 4:
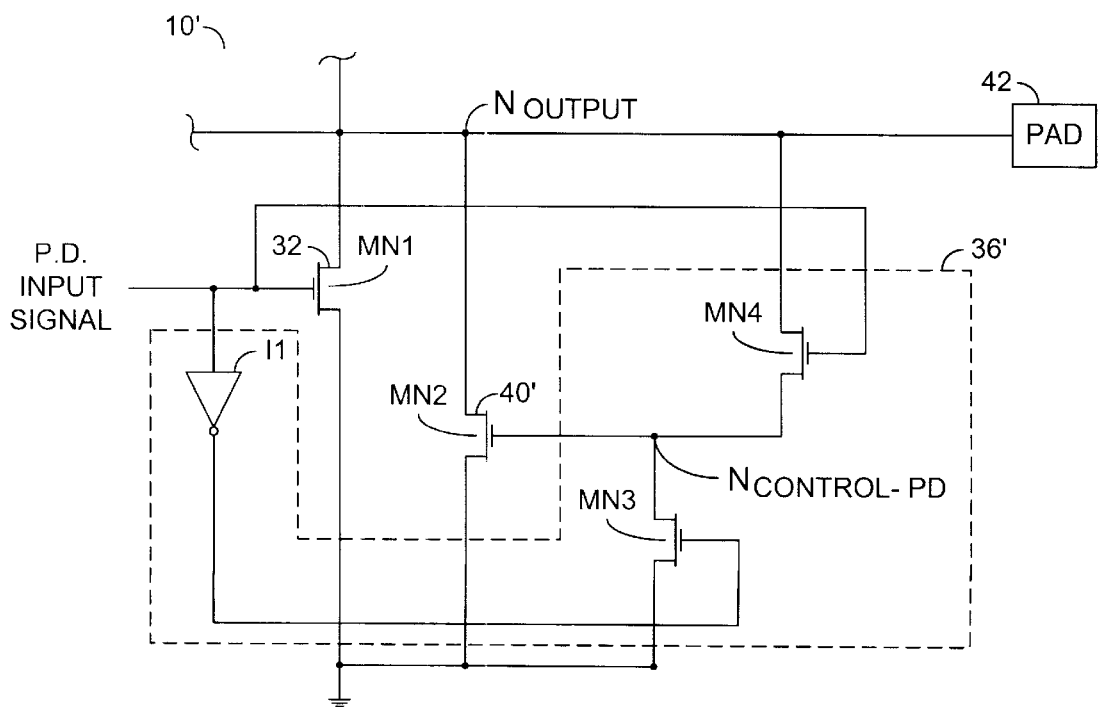
FIG. 4 is a partial, schematic diagram view of a first preferred embodiment of an output buffer according to the present invention.

FIG. 4 shows a first preferred embodiment according to the invention, namely, output buffer 10¹. FIG. 4 is a partial schematic of the first preferred embodiment and shows pulldown means 32, control circuit 36, and driver 40 in greater detail, and which are collectively adapted for transitioning output signal to a logic low state. The pullup means 30 is not shown in FIG. 4. Buffer 10¹ may include primary high-impedance pulldown driver MN1, which corresponds to pulldown means 32, a low-impedance driver MN2 corresponding to driver 40 (designated 40¹ in FIG. 4), and a pulldown control circuit 36¹. Control circuit 36¹ may include an inverter I1, an enable transistor MN3, and a pass transistor MN4. Buffer 10¹ may be connected to pad 42.

Transistor MN1 may be sized to produce specification limits, such as $V_{OL}/I_{OL}$ for direct current (D.C.) drive. Transistor MN1 may be an N-channel field effect (MOS) transistor, or a plurality of such transistors arranged in parallel relation to meet the above-mentioned DC operational specifications. MN1 may therefore be selected based on conventional and well-known design principles. MN2 may also be an N-channel field effect (MOS) transistor and may have a relatively low impedance relative to MN1. When control circuit $36^1$ causes MN2 to conduct fully, the output impedance of buffer $10^1$ is approximately the impedance contributed by MN1 and MN2 in parallel, since MN1 and MN2 are in parallel, electrical relationship.

Inverter I1 of control circuit $36^1$ may comprise a conventional CMOS inverter. Enable transistor MN3 may be an N-channel field effect (MOS) transistor sized sufficiently to maintain, when on, the gate terminal of MN2 at or around a ground voltage. Thus, when the PD input signal is a logic low (i.e., the pulldown circuitry of buffer $10^1$ is inactive), MN3 ensures that MN2 will be kept off. MN4 may also be an N-channel field effect (MOS) transistor. Pass transistor MN4 is responsive to the PD input signal on its gate terminal, and the output node voltage on its drain terminal, to generate the control signal on control node $N_{CONTROL-PD}$. The conductivity of MN2 varies according to the magnitude of the control signal. Variations in the conductivity of MN2 are operative to adjust the output impedance of buffer $10^1$. Transistors MN2 and MN4 are sized so that the output impedance of MN1 and MN2, in parallel, may be controlled to span the expected impedance of the load transmission line 14. For example, in an embodiment where $V_{cc}$ is approximately 3.3 volts, $V_{ss}$ is approximately 0 volts, and where $Z_o$ may be in the range between about 30 ohms and 100 ohms, MN2 and MN4 may preferably be sized so that the parallel combination of MN1 and MN2 is initially approximately about 17 ohms to get the correct plateau level, (when MN2 is fully "on"), but then changes to approximately 57 ohms as MN2 turns "off". It should be noted that 57 ohms is the required minimum. The circuit will perform adequately with any reasonable impedance which is greater than 57 ohms, for example 100 ohms.

Figure 5:
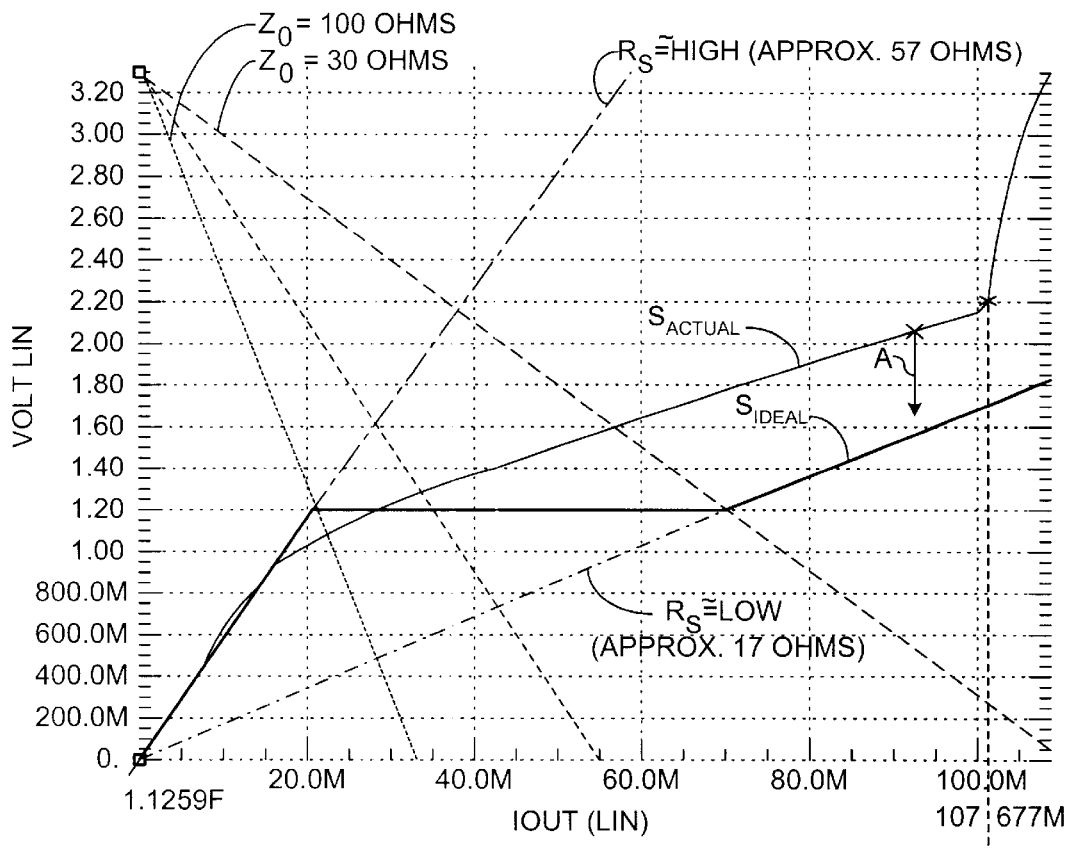
FIG. 5 is a simplified voltage versus current diagram showing the response of an output buffer according to the invention.

FIG. 5 is a current (I) versus voltage (V) diagram showing the characteristics of the operation of buffer $10^1$. The graph shows a pair of transmission line loads for $Z_o$ equal to 30 ohms and 100 ohms. In addition, the graph also shows, in dashed line format, a buffer output impedance $R_s$ of 57 ohms and 17 ohms. The actual IV characteristic of buffer $10^1$ (FIG. 4) is designated $S_{actual}$ in FIG. 5. An ideal IV characteristic is shown in heavy blackline format and is designated $S_{ideal}$.

Figure 6:
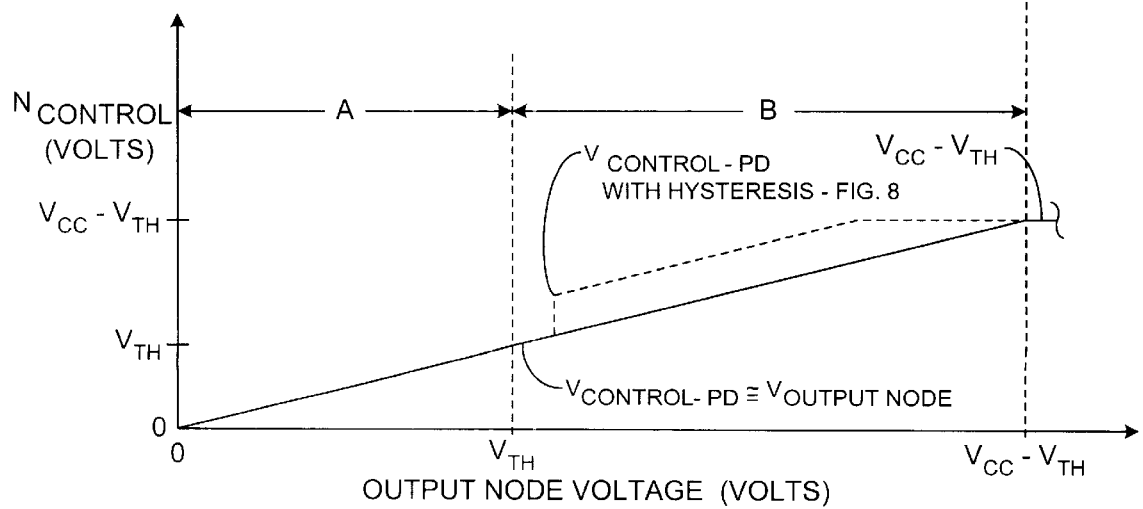
FIG. 6 is a simplified voltage diagram view showing how a control node voltage varies in accordance with variations in an output node voltage for an output buffer according to the present invention.

Referring now to FIGS. 4, 5, and 6, the operation of output buffer $10^1$ will now be set forth. When the pulldown (PD) input signal is low (i.e., the output node $N_{output}$ is being pulled high by pullup means 30, not shown in FIG. 4, or is otherwise tri-stated), then the gate of MN2 is pulled to ground by enable transistor MN3—this ensures that MN2 will be kept "off".

When the PD input signal transitions from a logic low to a logic high, the output signal on the output node $N_{output}$ will transition from high-to-low. The gate terminal of MN2 is connected to the output node by way of pass transistor MN4. This feedback loop controls the conductivity of MN2, and thus the output impedance itself of buffer $10^1$. Prior to the transition, the output node is at a high voltage, which may be, for example, 3.3 volts in one embodiment. When the PD input signal transitions low-to-high, MN1 and MN4 turn on, while MN3 is turned off (i.e., to enable MN2). During a first stage or portion of the high-to-low output transition, designated as interval C in FIG. 6, the control node designated $N_{CONTROL-PD}$ maintains a voltage level of about $V_{cc}-V_{th}$ until the output node $N_{output}$ drops below that voltage. During this first portion of the output transition, the voltage on the control node turns MN2 on, which effectively assists MN1 in pulling the pad voltage down (i.e., discharging the output node).

During a second stage or portion of the output transition, namely, when the voltage of the output signal falls below $V_{cc}-V_{th}$, the voltage on the control node substantially follows the voltage on the output node. This second portion of the output transition is designated as interval B in FIG. 6. As the voltage on the output node drops, the gate bias applied to MN2 also drops, thereby increasing the impedance (i.e., reducing the conductivity) of MN2. Since the output impedance of the buffer is the parallel combination of MN1 and MN2, the effective output impedance of the output buffer $10^1$ increases (as a function of the control voltage, which in turn follows the output node voltage). This results in an output impedance during the interval which is a function of the transmission line impedance.

During a third stage or portion of the output transition, when the output node voltage reaches approximately $V_{th}$, the driver MN2 turns "off", leaving the pulldown transistor MN1 alone to drive the output. Note that while the actual response of the embodiment of FIG. 4 differs slightly from the response designated $S_{ideal}$ (with respect to plateau voltage), the IV characteristic does indicate a smooth and rapid transition between low impedance (i.e., MN1 and MN2 operating fully on, in parallel), and a relatively high impedance (i.e., MN1 operating alone), as a function of the transmission line impedance.

In another aspect of the invention, a method of varying an output impedance of an output buffer connected to a transmission line is provided. The first basic step involves varying a magnitude of a control signal (i.e., as a function of the impedance of the transmission line load) as a function of the output node voltage over a predetermined range of output node voltages. The next step involves adjusting the output impedance of the buffer in response to the varying magnitude control signal. The second step may be implemented by performing the substep of varying a conductivity of a driver transistor connected to the output node in accordance with the control signal to vary the output impedance of the buffer as a function of (i) the conductivity of the driver, and (ii) the conductivity of one of the pullup means or pulldown means (whichever is active). Preferably, the relationship between MN1 and MN2 is a parallel electrical relationship. A further step in the inventive methodology may involve lowering the control signal during the above-mentioned third (final) stage of the output transition to thereby completely decouple the driver from the output node. This has the effect of increasing the output impedance of the buffer. The increased output impedance may improve damping of oscillations due to reflected waves.

Figure 7:
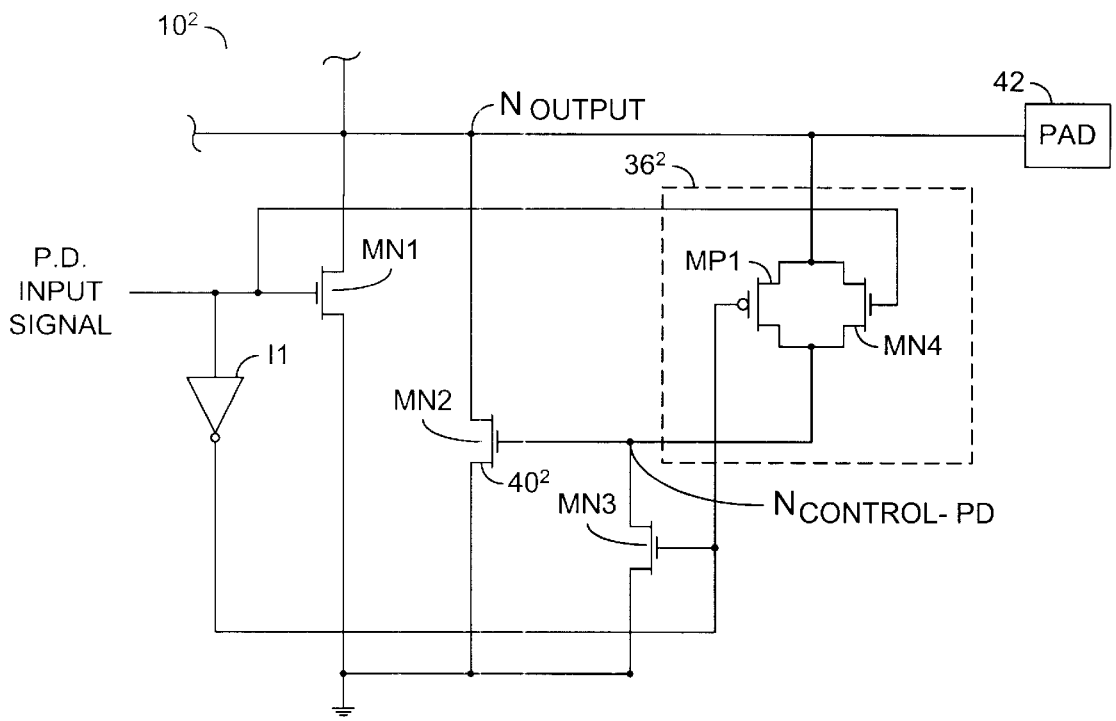
FIG. 7 is a partial, schematic diagram view of a second preferred embodiment according to the present invention.

FIG. 7 illustrates a second preferred embodiment according to the present invention, namely output buffer $10^2$. Buffer $10^2$ differs from buffer $10^1$ by the addition of pass transistor MP1, which may be a p-channel field-effect (MOS) transistor. Thus, a control circuit $36^2$ may comprise inverter I1, transistor M3, and a transmission gate including MN4 and MP1. MP1 and MN4 combine to form a transmission gate for connecting the output node $N_{output}$ to the control node, designated $N_{CONTROL-PD}$ shown in FIG. 7. In certain circumstances, MP1 may not be required or desirable, as shown in FIG. 4. The addition of MP1 does not alter the basic operation of buffer $10^1$; however, the actual IV characteristic may differ somewhat.

Figure 8:
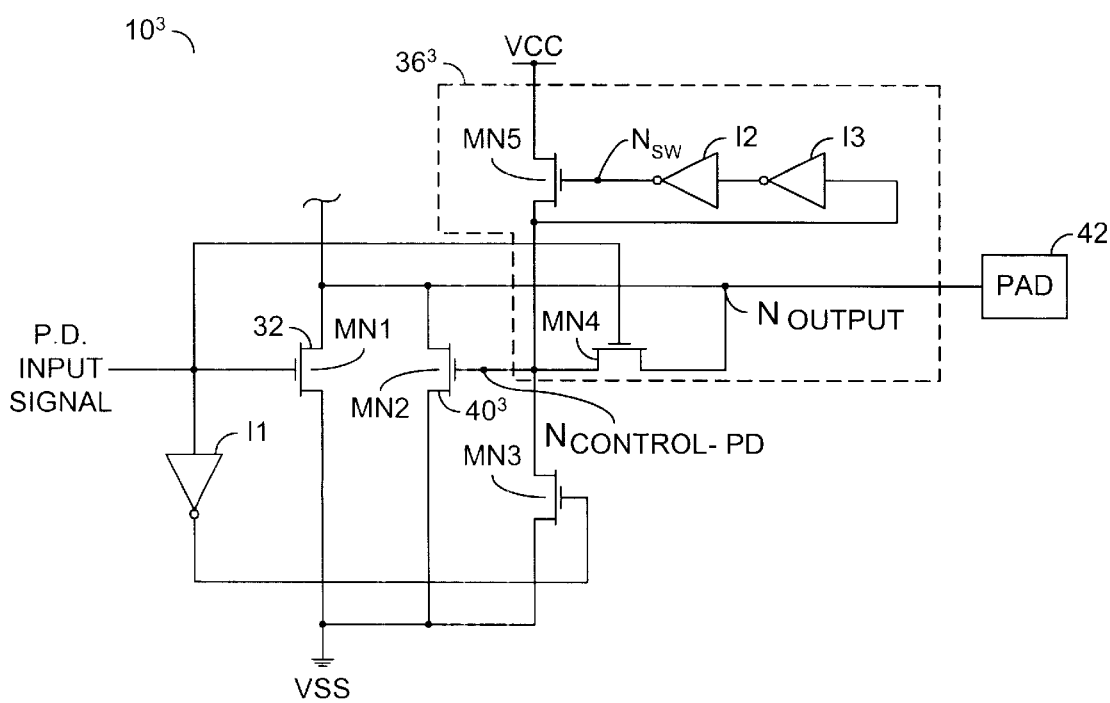
FIG. 8 is a partial, schematic diagram view of a third preferred embodiment according to the present invention.

FIG. 8 shows a third preferred embodiment in accordance with the present invention, namely output buffer $10^3$. Buffer $10^3$ differs from buffer $10^1$ by the addition of a means for varying the magnitude of the control signal on the control node $N_{CONTROL-PD}$ and which comprises inverters I2, I3 and transistor MN5. Thus, a control circuit $36^3$ may include inverter I1, transistor MN3, transistor MN4, and the varying means comprising inverters I2, I3, and transistor MN5.

Applying the output node voltage directly to the gate of MN2 by way of a transmission gate, such as shown in FIG. 7, or by way of a pass gate, as shown in FIG. 4, may provide only a first apparent switching profile or level for the output buffer. However, other switching profiles may be desired under certain circumstances. As will be described in further detail below, the addition of the means for varying the control signal (of FIG. 8) has the effect of shifting the right-hand portion of the buffer's output IV characteristic downward, as indicated in FIG. 5 by the arrow designated A. This additional structure, in effect, helps to provide an actual IV response closer to an ideal IV response. By applying a Schmitt trigger or a hysteresis type effect (e.g., the above-mentioned means for varying the control signal) to the feedback voltage provided by pass gate MN4, the following may be accomplished: (i) the transistor MN2 may be made to switch off (i.e., increase its impedance) more abruptly across a given output node voltage range, and (ii) the turn on voltage for the transistor MN2 may be tailored to obtain a desired output waveform plateau level.

In operation, assume that when the PD input signal is low, the output node is high, due to pullup means 30 (not shown in FIG. 8) being active. Since the PD input signal is low, the output of I1 is high, and MN3 is "on", which pulls the voltage on the control node to ground, thus ensuring that MN2 is fully "off". Since the control node is low, the switch node, designated $N_{sw}$, is also low. This keeps MN5 "off".

When the PD input signal transitions low-to-high, the output node begins to switch high-to-low. MN4 will immediately turn on so that the relatively high level voltage on the output node will be transferred to the control node, thus turning MN2 "on". Since the control node is now high, the switch node will also become high, thus turning MN5 on. MN5 is a relatively weak transistor, but it will try to pull the control node higher, or at least within one threshold $V_{thn}$ of $V_{cc}$ (given that MN5 may be an N-channel transistor). It should be understood that MN5 could be a P channel device providing that the number of inverters (I2, I3) was changed—the circuit would then be equivalent. The impact of the Hysteresis circuit (MN5+MN3+I1) on the gate voltage of MN2 ($N_{CONTROL-PD}$) is demonstrated in FIG. 6.

MN1 and MN2 together are relatively large devices and will pull the pad voltage low, and this in turn will tend to pull the control node voltage low by way of transistor MN4. Since MN5 is trying to pull the control node high, there is a potential conflict between MN5 and the combined power MN1 and MN2 by way of MN4. The net result of this conflict will be that the voltage on the control node $N_{CONTROL-PD}$ will be a few hundred millivolts higher than the voltage on the output node $N_{output}$.

As the output node voltage decreases during the high-to-low transition, the switch node $N_{sw}$ will be driven to a logic zero level, as a function of the switching thresholds of inverters I3 and I2. This will occur even though the control node is still around 1 volt (assuming Vcc is approximately 3.3 volts). A logic zero on the switch node $N_{sw}$ will turn MN5 "off", and the voltage on the control node will rapidly converge to the same voltage on the output node. The voltage applied to the gate of MN2 decreases very rapidly as a result, tending to cause MN2 to shut off rapidly. Hence, the impedance of MN2 will rise rapidly, and this will appear at the output node as though the output impedance $R_s$ of the buffer has risen rapidly. As indicated above, the foregoing has the effect of shifting the trace, designated $S_{actual}$ in FIG. 5, downwardly (at least the right most portion of the trace $S_{actual}$) in the direction of the arrow designated A in FIG. 5.

Figure 9:
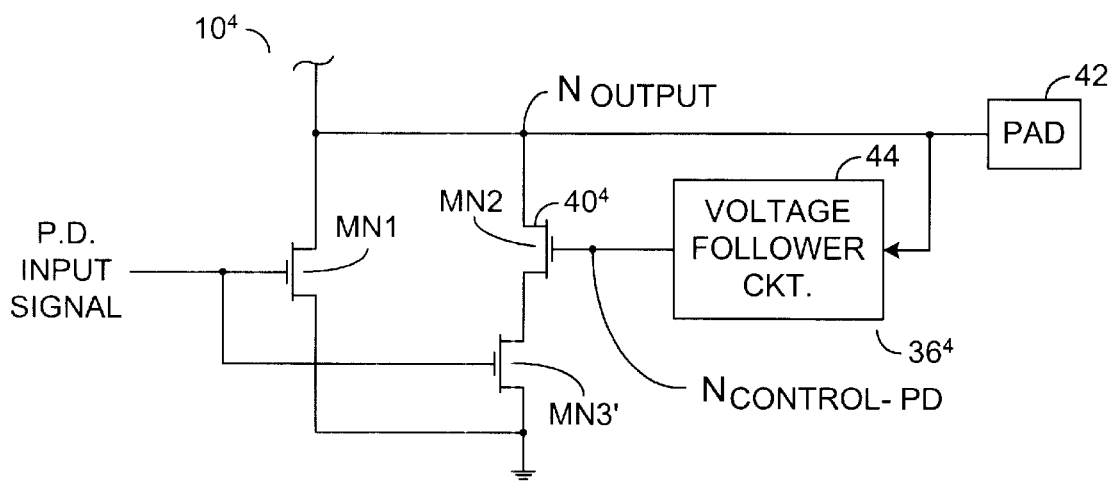
FIG. 9 is a partial, schematic diagram view of a fourth preferred embodiment according to the present invention.

FIG. 9 shows a fourth preferred embodiment of the present invention, namely output buffer $10^4$. Buffer $10^4$ includes pulldown transistor MN1, control circuit $36^4$ comprising enable transistor MN3' and voltage follower 44, and driver MN2. As with the previously described embodiments, MN1 may comprise one or more n-channel field-effect (MOS) transistors, and may be sized to produce the specification $V_{OL}/I_{OL}$ values for an output buffer DC drive.

MN3' is essentially an enable or switching transistor depending on whether the output node is to be driven high or low, as determined by the PD input signal. In series with MN3' is driver transistor MN2. The conductivity of driver MN2 is determined by the voltage developed at the output of a voltage follower circuit 44. The voltage follower circuit 44 is used to control the precise voltage on the pad which causes MN2 to turn off. Depending on the particular implementation of voltage follower circuit 44, the gate of MN2 may be higher or lower in voltage than the actual output node voltage.

In operation, and assuming prior to the output transition the output pad is at a logic 1 (e.g., 3 volts or above for $V_{cc}$ equals 3.3 volts), then when MN2 switches, the total drive on the output node is the combination of MN1 in parallel with the series connection of MN2 and MN3'. As the output node voltage decreases, the gate voltage on MN2 also decreases wherein MN2 begins to turn "off". The apparent output impedance ($R_s$) thus begins to increase. The output impedance will increase until the series connected MN2/MN3' combination turns completely off and only MN1 is left on. The voltage follower circuit 44 may, in effect, perform a function similar to the combination of inverters I2, I3 and transistor MN5 in FIG. 8, namely, to maintain the control node voltage at a small offset relative to the output node voltage. This may develop an actual IV characteristic $S_{actual}$ of the output buffer closer to an ideal IV characteristic $S_{ideal}$, such as illustrated in FIG. 5.

Figure 10:
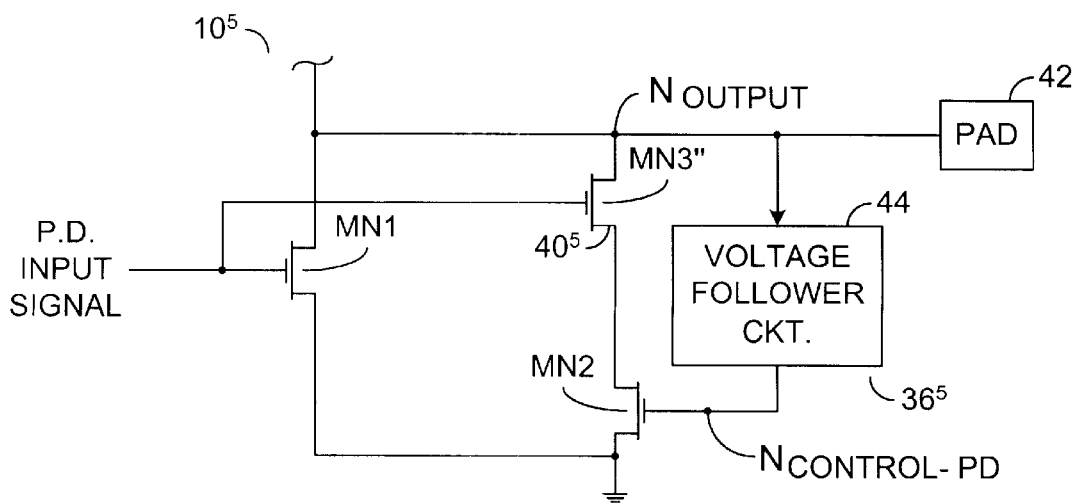
FIG. 10 is a partial, schematic diagram view of a fifth preferred embodiment according to the present invention.

FIG. 10 shows a fifth preferred embodiment according to the present invention, namely output buffer $10^5$. This embodiment is essentially the same as the embodiment shown in FIG. 9, except that the signals applied to the respective gate terminals of MN2 and MN3" have been swapped. Thus, control circuit $36^5$ may include transistor MN3. The circuit in FIG. 10 produces a slightly different response because of the inherent capacitances in the circuit (e.g., between gate and drain) but also because MN2 and MN3" always act to a certain extent as a voltage divider. Since the switching behavior of the transistor depends on the gate-to-source voltage $V_{gs}$, then the behavior of MN2 depends on both the gate (output node) voltage and the voltage on the control node $N_{CONTROL-PD}$. In addition, the behavior of MN2 is more linear than compared to the embodiment of FIG. 9, since its source terminal is always grounded.

An output buffer in accordance with the present invention automatically matches the impedance of any load transmission line over a predetermined range, and, which further provides an optimized plateau level to reduce undefined logic level time. The output buffer also increases the output impedance during the final portion of the output transition so as to increase damping of noise oscillations due to the return wave from the far end of the transmission line.

It is to be understood that the term "match" or "matching", in this application, does not necessarily mean "equal", although in certain circumstances it may.

Particularly, "match" or "matching" means adjusting or varying the output impedance, relative to the characteristic impedance of the transmission line, so that a desired or required plateau voltage level is obtained. Thus, in a preferred embodiment, $R_s$ should be about ½ $Z_o$ when they are "matched", in order to obtain the desired plateau level. Variations and modifications may be possible.

While the invention has been particularly shown and described with reference with to the preferred embodiments thereof, it is well understood by those skilled in the art that various changes and modifications can be made in the invention without departing from the spirit and scope thereof.

What is claimed is:

1. An apparatus comprising:
   a transmission line configured to present an output signal having a first impedance; and
   an output circuit coupled to said transmission line having an output impedance configured to (i) match said output impedance to said first impedance and (ii) change said output impedance to a second impedance, wherein said output circuit comprises one or more transmission gates, each configured to generate at least one of one or more control signals in response to an input signal and one or more field effect transistors.

2. The apparatus according to claim 1, wherein said output circuit is further configured to match said output impedance to said first impedance for a predetermined time.

3. The apparatus according to claim 1, wherein said output circuit comprises:
   an output stage configured to generate said output signal in response to said input signal;
   a control circuit configured to (i) receive said output signal and (ii) generate said one or more control signals that vary according to said magnitude of said output signal; and
   a driver responsive to said one or more control signals and in electrical communication with said transmission line configured to adjust said output impedance in response to said one or more control signals.

4. The apparatus according to claim 1, wherein said output circuit comprises (i) a pull-up transistor configured to raise said output signal to a first predetermined voltage level when in a first logic state and (ii) a pull-down transistor configured to lower said output signal to a second predetermined voltage level when in a second logic state.

5. The apparatus according to claim 4, wherein said first predetermined voltage level comprises a high voltage level and said second predetermined voltage level comprises a low voltage level.

6. The apparatus according to claim 4, wherein said output circuit is further configured to (i) connect said first predetermined voltage level to said output signal during a first transition of said output signal and (ii) connect said second predetermined voltage level to said output signal during a second transition of said output signal.

7. The apparatus according to claim 1, wherein said output circuit is further configured to adjust said magnitude of said output signal to a first predetermined value over a first predetermined range of output voltages.

8. The apparatus according to claim 7, wherein said driver is further configured to adjust said magnitude of said output signal to a second predetermined value over a second predetermined range of output voltages, wherein said second predetermined value is higher than said first predetermined value.

9. The apparatus according to claim 3, wherein (i) said control circuit comprises one or more voltage followers, each configured to generate at least one of said one or more control signals in response to said output signal and (ii) said driver comprises one or more field effect transistors.

10. The apparatus according to claim 3, wherein (i) said control circuit comprises one or more pass transistors, each configured to generate at least one of said one or more control signals in response to said output signal and (ii) said driver comprises one or more field effect transistors.

11. The apparatus according to claim 3, wherein said driver is further configured to control a second magnitude of said one or more control signals.

12. The apparatus according to claim 1, wherein said output circuit comprises (i) one or more inverters connected in series, each having an input coupled to said one or more control signals and an output connected to a switch node and (ii) one or more switch transistors responsive to said switch node, each coupled to at least one of said one or more control signals.

13. A method for varying an output impedance, comprising the steps of:
   (A) presenting an output signal having a first impedance, wherein said output signal is generated by an output circuit comprising one or more transmission gates, each configured to generate at least one of one or more control signals in response to an input signal and one or more field effect transistors;
   (B) matching said output impedance to said first impedance; and
   (C) changing said output impedance to a second impedance.

14. The method according to claim 13, wherein step (B) further comprises matching said output impedance to said first impedance for a predetermined time.

15. The method according to claim 13, wherein step (B) comprises the sub-steps of:
   (B-1) generating said output signal in response to said input signal;
   (B-2) generating said one or more control signals that vary according to a magnitude of said output signal; and
   (B-3) adjusting said output impedance in response to said one or more control signals.

16. The method according to claim 15, wherein sub-step (B-1) further comprises (i) raising said output signal to a first predetermined voltage level during a first logic state and (ii) lowering said output signal to a second predetermined voltage level during a second logic state.

17. The method according to claim 15, wherein sub-step (B-3) further comprises (i) connecting said first predetermined voltage level to said output signal during a first transition of said output signal and (ii) connecting said second predetermined voltage level to said output signal during a second transition of said output signal.

18. The method according to claim 15, further comprising sub-step:
   (B-4) controlling a second magnitude of said one or more control signals.

19. An apparatus comprising:
   a transmission line configured to present an output signal having a first impedance; and
   an output circuit coupled to said transmission line having an output impedance configured to (i) match said output impedance to said first impedance and (ii) change said output impedance to a second impedance, wherein said output circuit comprises (i) one or more inverters connected in series, each having an input coupled to one or more control signals and an output connected to a switch node and (ii) one or more switch transistors responsive to said switch node, each coupled to at least one of said one or more control signals.

* * * * *